United States Patent
Chen

(10) Patent No.: US 12,016,341 B2
(45) Date of Patent: Jun. 25, 2024

(54) PEARL DORAYAKI STRUCTURE AND MANUFACTURING METHOD THEREOF

(71) Applicant: SAN SHU GONG FOOD CO., LTD., New Taipei (TW)

(72) Inventor: Mei-Yao Chen, New Taipei (TW)

(73) Assignee: SAN SHU GONG FOOD CO., LTD., New Taipei (TW)

( * ) Notice: Subject to any disclaimer, the term of this patent is extended or adjusted under 35 U.S.C. 154(b) by 0 days.

(21) Appl. No.: 18/540,811

(22) Filed: Dec. 14, 2023

(65) Prior Publication Data
US 2024/0108019 A1    Apr. 4, 2024

Related U.S. Application Data

(62) Division of application No. 17/897,235, filed on Aug. 29, 2022.

(51) Int. Cl.
*A21D 13/32*    (2017.01)
*A23L 7/10*    (2016.01)

(52) U.S. Cl.
CPC .............. *A21D 13/32* (2017.01); *A23L 7/198* (2016.08); *A23V 2002/00* (2013.01)

(58) Field of Classification Search
None
See application file for complete search history.

(56) References Cited

FOREIGN PATENT DOCUMENTS

JP    02261345 A    *    10/1990

OTHER PUBLICATIONS

Facebook dorayaki (Year: 2018).*

* cited by examiner

*Primary Examiner* — Jyoti Chawla
(74) *Attorney, Agent, or Firm* — Leong C. Lei

(57) ABSTRACT

A pearl dorayaki structure includes a first internal layer formed of one or multiple pearls in a spherical form, a second internal layer formed of a sticky filling, and surface layers formed of patty in a soft and dense form and wrapping the second internal layer. The surface layers formed by subjecting the dorayaki patty raw material to steps of stirring and heating to be then shaped to form the dorayaki patty; the first internal layer is formed by subjecting the pearl raw material to steps of stirring and steaming so as to be shaped as the pearls; and the second internal layer is formed of the filling that is formed by subjecting fructose and edible shortening to stirring; and the second internal layer and the first internal layer are subjected to stuffing and shaping so as to be wrapped with the surface layers to thereby form the pearl dorayaki.

8 Claims, 6 Drawing Sheets

PEARL DORAYAKI STRUCTURE AND MANUFACTURING METHOD THEREOF

CROSS-REFERENCE TO RELATED APPLICATIONS

This is a divisional application of co-pending patent application Ser. No. 17/897,235, filed on Aug. 29, 2022.

TECHNICAL FIELD OF THE INVENTION

The present invention relates generally to a pearl dorayaki structure and a manufacturing method thereof, and more particularly to a pearl dorayaki structure, and a manufacturing thereof, that presents a new mouthfeel of both dorayaki and pearls to thereby make the mouthfeel of a dorayaki unique and thus enhance the product value of the dorayaki.

DESCRIPTION OF THE PRIOR ART

A known dorayaki is a soft confection, as shown in FIG. 1, which comprises two outer layers 1 as a top and a bottom, and a filling 2. The top and bottom layers 1 are generally made of a soft flour material and the top and bottom layers 1 wrap a single filling 2, which can be of various flavors, such as red bean, mung bean, chestnut, and strawberry. Such a traditional soft confection has been long kept for an existing flavor of one single filling 2. No significant breakthrough has been developed. Consequently, the consumers are only allowed to do purchasing by selecting a preferred single traditional flavor. This makes it impossible to enhance the product value of the dorayaki confections.

Recently, pearls (tapioca balls) are popular in Taiwan as a unique food and are commonly used in making of pearl milk tea drinks, or pearl based ice products or frozen desserts, which are popular both locally and globally, because such products or desserts presents not only the aromatic and sweety flavor of tea products or ice desserts, but also the soft-chewy mouthfeel of the pearls. Such a combined flavor or taste has been only found in the pearl milk tea drinks and similar frozen desserts and has been regrettably not included in other food products. The present invention aims to provide a pearl dorayaki structure, and also a manufacturing method thereof, which makes a dorayaki exhibiting a combined flavor to present a new mouthfeel of both dorayaki and pearls.

SUMMARY OF THE INVENTION

The primary objective of the present invention is to provide a pearl dorayaki structure and a manufacturing method thereof, in which pearls are used in combination with a sticky viscous filling to allow a dorayaki to exhibit a combined mouthfeel so as to present a unique taste of both dorayaki and pearl to thereby enhance the product value of the dorayaki.

The pearl dorayaki comprises, in sequence from center to outside, a first internal layer, a second internal layer wrapping the first internal layer, and surface layers wrapping the second internal layer. The first internal layer is formed of one or more than one pearl having different flavors. The second internal layer comprises a sticky filling. The surface layers comprise a dorayaki patty formed of a dorayaki patty raw material and exhibiting a soft dense form, so that the dorayaki exhibits a combined flavor and the combination of the pearls of the first internal layer and the filling of the second internal layer makes the dorayaki, when eaten, presenting a new mouthfeel of both the dorayaki and the pearls.

The method for manufacturing the pearl dorayaki is such that the surface layers are formed by subjecting the dorayaki patty raw material to steps of stirring and heating to be then shaped to form the dorayaki patty; the first internal layer is formed by subjecting the pearl raw material to steps of stirring and steaming so as to be shaped as the pearls; and the second internal layer and the first internal layer are subjected to stuffing and shaping so as to be wrapped with the surface layers to thereby form the pearl dorayaki.

In the above-described method for manufacturing the pearl dorayaki, the dorayaki patty raw material of the surface layers comprises 26.5% wheat flour; 18.2% egg; 16.4% granulated sugar; 4.4% soybean salad oil; 3.6% malt sugar; 1.5% honey; 1.5% sorbitol; 0.2% xanthan gum; 0.2% flavoring; 0.1% sodium bicarbonate, and 0.1% aluminum-free baking powder.

In the above-described method for manufacturing the pearl dorayaki, the pearl raw material of the first internal layer comprises: 2.004% water; 1.68% hydroxypropyl distarch phosphate; 0.072% prepared mix powder; 0.034% brown sugar flavoring; 0.005% caramel coloring; 0.005% fatty acid glyceride, and 0.005% potassium sorbate.

In the above-described method for manufacturing the pearl dorayaki, the step of heating the dorayaki patty raw material of the surface layers is to heat the mixed and stirred dorayaki patty raw material at a temperature around 180° C. for a time period of approximately 1 minute and 20 seconds for drying.

In the above-described method for manufacturing the pearl dorayaki, the steaming of the pearls is to fully cook the mixed and stirred raw material through steaming at a temperature of around 100° C. for approximate 20 minutes.

In the above-described method for manufacturing the pearl dorayaki, the filling of the second internal layer comprises 8% fructose; 7.2% edible shortening, and 0.1% flavoring.

DETAILED DESCRIPTION OF THE PREFERRED EMBODIMENT

Figure 1:
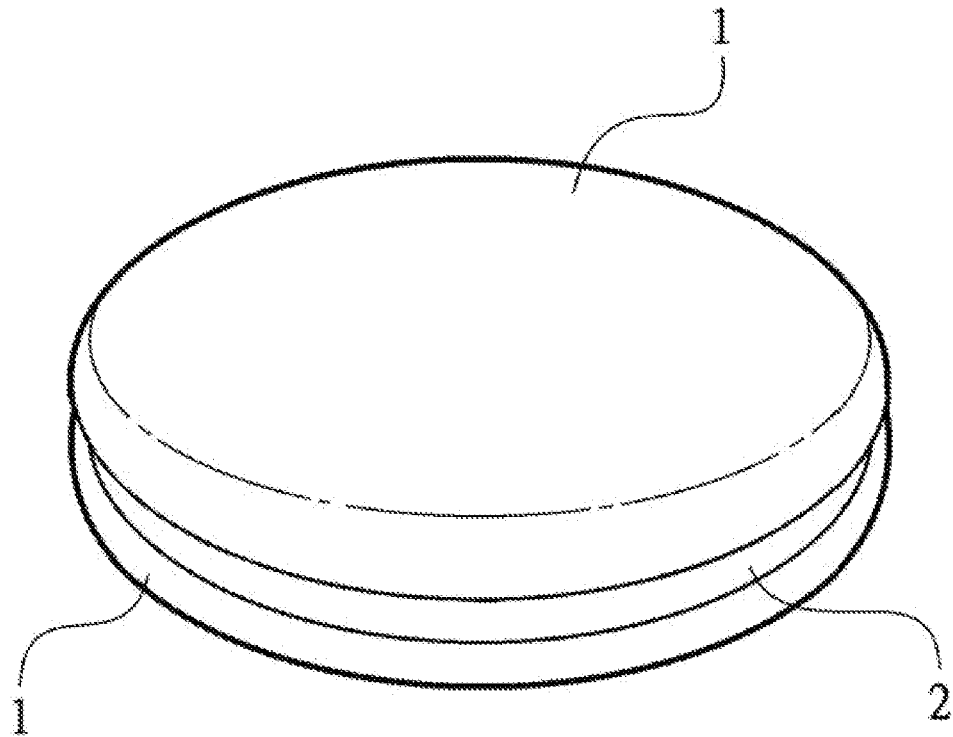
FIG. 1 is a perspective view showing a known dorayaki.
Figure 2:
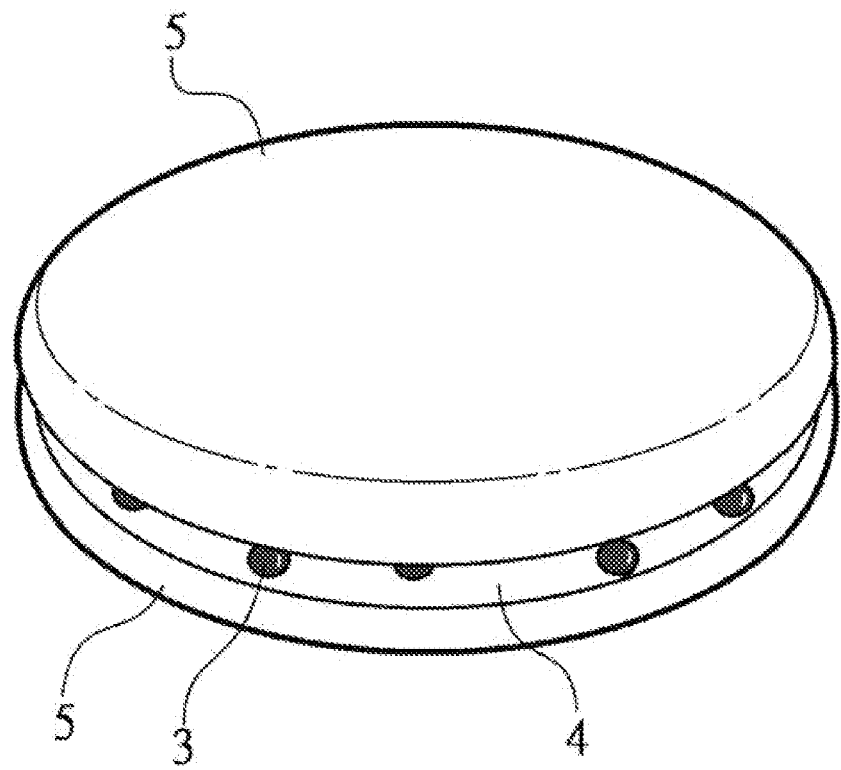
FIG. 2 is a perspective view showing a dorayaki according to the present invention.

Referring to FIG. 2, a partly sectioned view of a pearl dorayaki according to the present invention is shown. As shown in the drawing, the pearl daifuku according to the present invention comprises, in sequence from center to outside, a first internal layer 3, a second internal layer 4 wrapping the first internal layer 3, and two, top and bottom, surface layers 5 wrapping the second internal layer 4. The first internal layer 3 is formed of one or more than one pearl that is made in a spherical form and is made of different flavors. The second internal layer 4 is a sticky filling. The two, top and bottom, surface layers 5 are each a dorayaki patty that is made in a soft and dense form. The second internal layer 4 is arranged with a suitable thickness wrapping around the first internal layer 3. The two, top and bottom, surface layers 5 are each of a suitable thickness to wrap the second internal layer 4. A dorayaki so manufactured exhibits a combined flavor, and the pearls of the first internal layer 3 combined with the filling of the second internal layer 4 allows the pearl dorayaki exhibiting, when being eaten, a new mouthfeel of both dorayaki and pearls.

Figure 3:
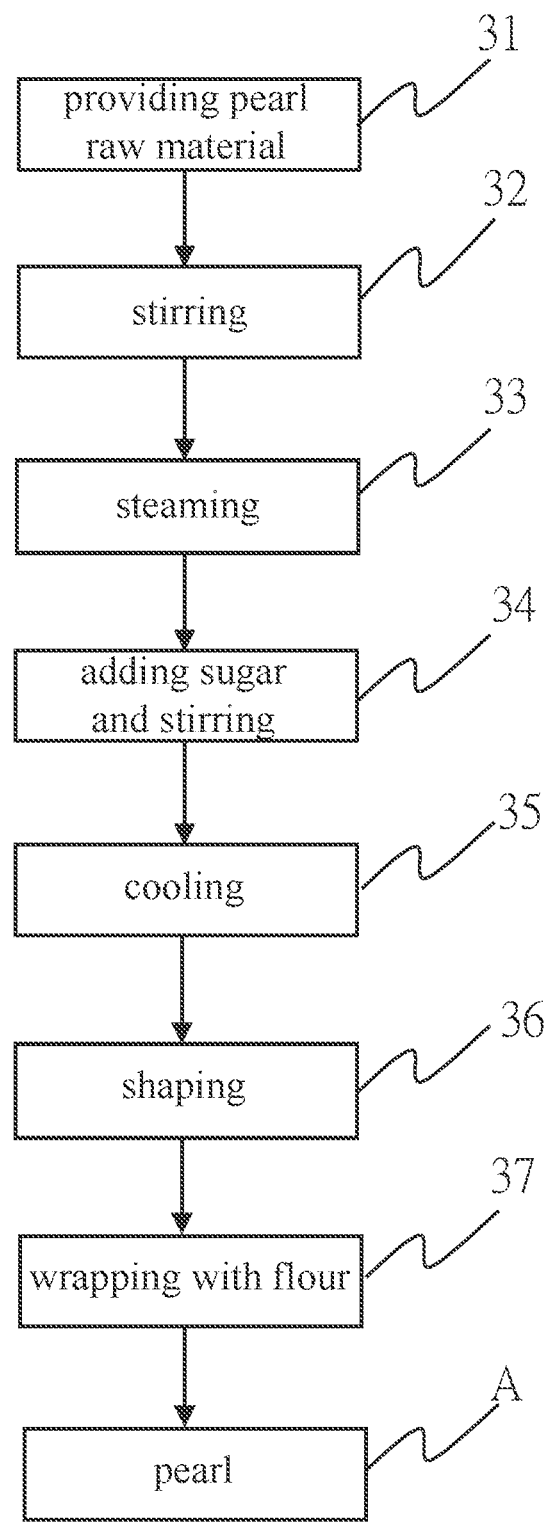
FIG. 3 is a flow chart showing a process for manufacturing pearls of a first internal layer of the present invention.

Referring to FIG. 3, a flow chart showing a process for manufacturing the first internal layer 3 according to the present invention is provided. As shown in the drawing, the process for manufacturing the pearls of the first internal layer 3 of the present invention comprises the following steps:

(1) providing pearl raw material 31, wherein the pearl raw material comprises: 2.004% water; 1.68% hydroxypropyl distarch phosphate; 0.072% prepared mix powder; 0.034% brown sugar flavoring; 0.005% caramel coloring; 0.005% fatty acid glyceride, and 0.005% potassium sorbate.

(2) stirring 32, wherein a predetermined amount of the pearl raw material of Step 1 is mixed and stirred.

(3) steaming 33, wherein the mixed and stirred pearl raw material of Step 2 is steamed at a temperature of around 100° C. for approximately 20 minutes.

(4) adding sugar and stirring 34, wherein the steamed pearl raw material of Step 3 is added with 6.396% malt sugar and 1.68% granulated sugar and subject to uniform stirring.

(5) cooling 35, wherein a sugar-added and stirred semifinished product of Step 4 is placed in room temperature for cooling.

(6) shaping 36, wherein the cooled semifinished product is diced and shaped in a pellet form.

(7) wrapping with flour 37, wherein the diced and shaped semifinished product is wrapped with 0.12% potato flour to form pearls A.

Figure 4:
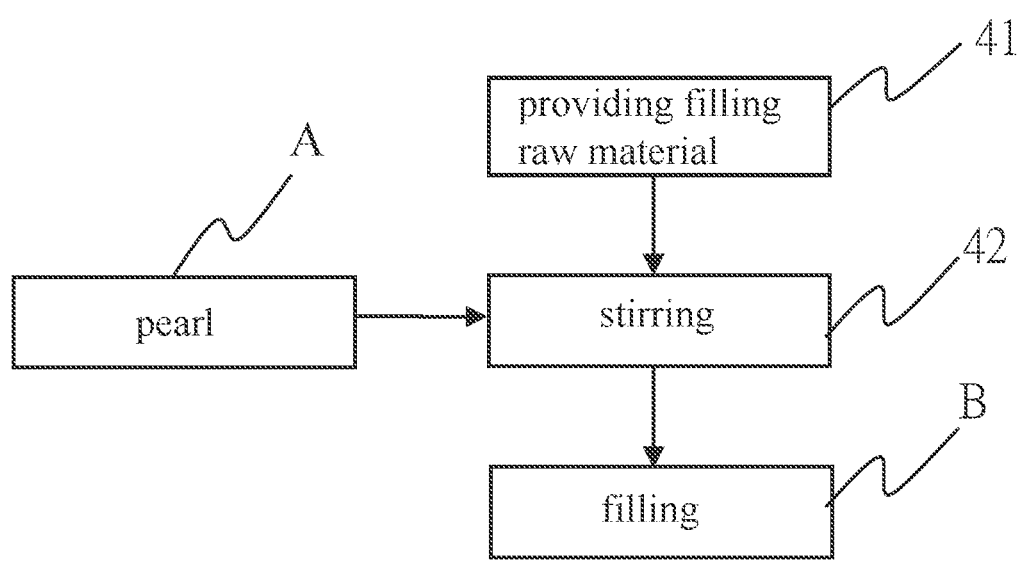
FIG. 4 is a flow chart showing a process for manufacturing a filling of a second internal layer of the present invention.

Referring to FIG. 4, a flow chart showing a process for manufacturing the filling of the second internal layer according to the present invention is provided. As shown in the drawing, the process for manufacturing the filling of the second internal layer 4 of the present invention comprises the following steps:

(1) providing filling raw material 41, wherein the filling raw material comprises: 8% fructose; 7.2% edible shortening, and 0.1% flavoring.

(2) stirring 42, wherein a predetermined amount of the filling raw material of Step 1 is mixed with the pearls A provided previously and stirred to form a filling B.

Figure 5:
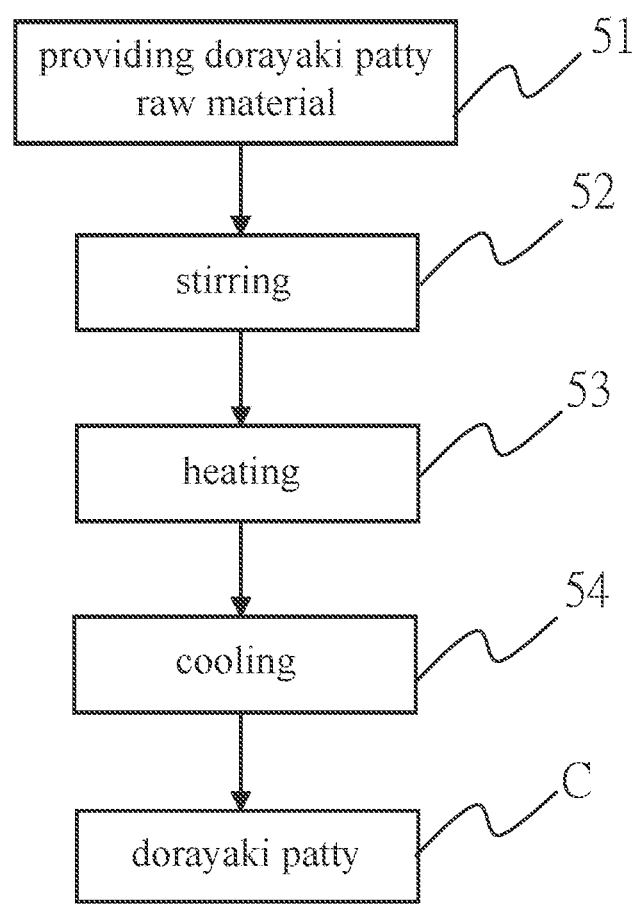
FIG. 5 is a flow chart showing a process for manufacturing dorayaki patties of a top surface layer and a bottom surface layer of the present invention.

Referring to FIG. 5, a flow chart showing a process for manufacturing the two, top and bottom, surface layers 5 according to the present invention is provided. As shown in the drawing, the process for manufacturing dorayaki patty of the two, top and bottom, surface layers 5 according to the present invention comprises the following steps:

(1) providing dorayaki patty raw material 51, wherein the dorayaki patty raw material comprises: 26.5% wheat flour; 18.2% egg; 16.4% granulated sugar; 4.4% soybean salad oil; 3.6% malt sugar; 1.5% honey; 1.5% sorbitol; 0.2% xanthan gum; 0.2% flavoring; 0.1% sodium bicarbonate, and 0.1% aluminum-free baking powder.

(2) stirring 52, wherein a predetermined amount of the dorayaki patty raw material of Step 1 is mixed and stirred.

(3) heating 53, wherein the mixed and stirred dorayaki patty raw materials of Step 2 is heated at a temperature of around 180° C. for a time period of approximately 1 minute and 25 second for drying to form a dorayaki patty C.

(4) cooling 54, wherein a finished product of the dorayaki patty C of Step 3 is placed in room temperature for cooling.

Figure 6:
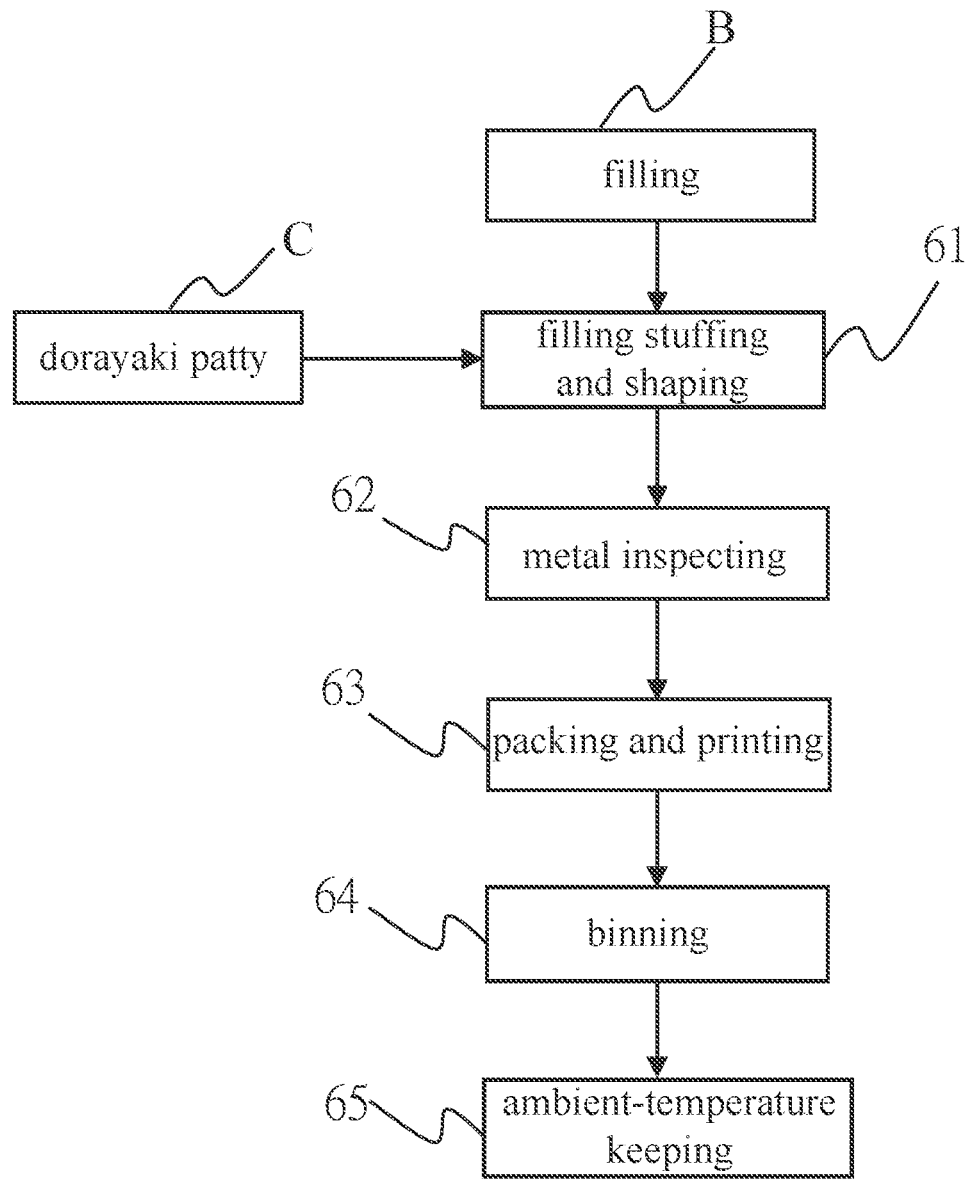
FIG. 6 is a flow chart showing a process for manufacturing a pearl dorayaki according to the present invention.

Referring to FIG. 6, a flow chart showing a process for manufacturing a pearl dorayaki according to the present invention is provided. As shown in the drawing, the process for manufacturing a pearl dorayaki according to the present invention comprises the following steps:

(1) filling stuffing and shaping 61, wherein the pearls A of the first internal layer 3 and the filling B of the second internal layer 4 are stuffed into the dorayaki patty C of the two, top and bottom, surface layers 5 to form a pearl dorayaki.

(2) metal inspecting 62, wherein equipment is applied to inspect whether or not a product of the pearl dorayaki formed in Step 1 contains a metallic ingredient.

(3) packing and printing 63, wherein the pearl dorayaki of Step 2 is packed and product illustration and marking are printed.

(6) binning 64, wherein a predetermined quantity of the pearl dorayaki are collected and binned.

(7) ambient-temperature keeping 65, wherein the binned pearl dorayakis are kept in an ambient temperature for being ready to shipping.

In summary, the present invention provides a pearl dorayaki structure, and a manufacturing method thereof, which comprises a first internal layer formed of one or more than one pearl having different flavors, combined with a second internal layer formed of a sticky filling, and surface layers formed of a dorayaki patty raw material. The pearls combined with the sticky filling and the dorayaki patty makes the dorayaki exhibiting a combined mouthfeel and presenting, when eaten, a new taste of both the dorayaki and the pearls, so as to enhance the product value of the dorayaki, this being a practical design and innovated creation.

I claim:

1. A pearl dorayaki manufacturing method, comprising the following steps:

providing a predetermined amount of pearl raw material, which is mixed and stirred, and is steamed;

adding sugar to the steamed pearl raw materials and uniformly stirring, and then placing a sugar-added and stirred semifinished product in room temperature for cooling;

dicing and shaping the cooled semifinished product to form pearls in a pellet form, and wrapping with flour;

providing a predetermined amount of dorayaki patty raw material, which is mixed and stirred, and is heated;

placing a semifinished product of a heated dorayaki patty in room temperature for cooling;

providing a predetermined amount of filling raw material, which is mixed and stirred; and stuffing the pearls and the filling in the dorayaki patty for shaping as a pearl dorayaki.

2. The pearl dorayaki manufacturing method according to claim 1, wherein the pearl raw material comprises: 2.004% water; 1.68% hydroxypropyl distarch phosphate; 0.072% prepared mix powder; 0.034% brown sugar flavoring; 0.005% caramel coloring; 0.005% fatty acid glyceride, and 0.005% potassium sorbate.

3. The pearl dorayaki manufacturing method according to claim 1, wherein the steaming pearl raw material is added with 6.396% malt sugar and 1.68% granulated sugar, and is uniformly stirred.

4. The pearl dorayaki manufacturing method according to claim 1, wherein the shaped pearls are wrapped with 0.12% potato flour.

5. The pearl dorayaki manufacturing method according to claim 1, wherein the pearl raw material is steamed at a temperature around 100° C. for a time period of 20 minutes.

6. The pearl dorayaki manufacturing method according to claim 1, wherein the dorayaki patty raw material comprises: 26.5% wheat flour; 18.2% egg; 16.4% granulated sugar; 4.4% soybean salad oil; 3.6% malt sugar; 1.5% honey; 1.5% sorbitol; 0.2% xanthan gum; 0.2% flavoring; 0.1% sodium bicarbonate, and 0.1% aluminum-free baking powder.

7. The pearl dorayaki manufacturing method according to claim 1, wherein the dorayaki patty raw material is heated at a temperature of around 180° C. for a time period of approximately 1 minute and 20 seconds.

8. The pearl dorayaki manufacturing method according to claim 1, wherein the filling raw material comprises: 8% fructose; 7.2% edible shortening, and 0.1% flavoring.

\* \* \* \* \*